US006394534B1

(12) United States Patent
Dean

(10) Patent No.: US 6,394,534 B1
(45) Date of Patent: May 28, 2002

(54) POLY-BILT TRUCK

(75) Inventor: Timothy S. Dean, Ocala, FL (US)

(73) Assignee: Pro Poly of America, Inc., Ocala, FL (US)

( * ) Notice: Subject to any disclaimer, the term of this patent is extended or adjusted under 35 U.S.C. 154(b) by 0 days.

(21) Appl. No.: 09/771,928

(22) Filed: Jan. 30, 2001

(51) Int. Cl.[7] .............................. A62C 27/00; B60J 7/00
(52) U.S. Cl. .......................... 296/183; 296/184; 169/24
(58) Field of Search ................................ 296/183, 184, 296/29, 30, 376; 169/24

(56) References Cited

U.S. PATENT DOCUMENTS

| | | | | | |
|---|---|---|---|---|---|
| 3,279,971 | A | * | 10/1966 | Gardner | 156/500 |
| 3,294,617 | A | * | 12/1966 | Way | 161/36 |
| 3,770,060 | A | * | 11/1973 | Forsyth et al. | 169/24 |
| 4,345,654 | A | * | 8/1982 | Carr | 169/24 |
| 4,593,855 | A | * | 6/1986 | Forsyth | 169/24 |
| 4,611,724 | A | * | 9/1986 | Watkins et al. | 220/5 |
| 4,678,041 | A | * | 7/1987 | Staudinger | 169/24 |
| 5,322,539 | A | * | 6/1994 | Mathisen et al. | 220/416 |
| 5,617,696 | A | * | 4/1997 | Young | 52/730.1 |
| 5,634,487 | A | * | 6/1997 | Downey | 137/355.12 |
| 5,820,718 | A | * | 10/1998 | Dean | 156/211 |
| 5,979,686 | A | * | 11/1999 | Dean | 220/4.13 |
| 6,161,719 | A | * | 12/2000 | Madison | 220/567 |

OTHER PUBLICATIONS

PolyBilt™ Body Company, Customer Letter and Brochure, Feb. 24, 2000, 5 pages.

* cited by examiner

*Primary Examiner*—Ken Patel
(74) *Attorney, Agent, or Firm*—Nixon & Vanderhye PC

(57) ABSTRACT

A commercial truck body is described, with particular reference to a fire truck body. The truck body if formulated of a co-polymer material with certain strategic corners of the co-polymer material being formed by a single sheet of copolymer bent into the predetermined angle and extrusion welded on the interior portion of the corner. Other junctions of the copolymer material are formulated using traditional fusion, butt, and other joint techniques. In the fire truck application, the liquid storage tank can be integral with the copolymer truck body such that the copolymer truck body formulates both the exterior of the truck body and the liquid storage tank itself. The liquid storage tank can alternatively be a separately formulated copolymer tank also formed with bent corners and interior extrusion welds.

13 Claims, 6 Drawing Sheets

POLY-BILT TRUCK

FIELD OF THE INVENTION

This invention relates to truck bodies. More particularly, this invention relates to methods and apparatus for providing and strengthening co-polymer truck bodies.

BACKGROUND OF THE INVENTION

U.S. Pat. No. 5,820,718, commonly assigned, describes a liquid storage tank having high strength properties resulting from the use of bended co-polymer sheets having extrusion welds to fuse material into the interior corner of some or all of the bend junctions. U.S. Pat. No. 5,820,718 (the '718 patent) is incorporated by reference herein, in its entirety as if its entire disclosure was written herein. The copolymer described in the '718 patent is marketed under the tradename "polyprene," and is an extruded composition of polypropylene polyethylene with carbon introduced in the extrusion for UV protection. The technical descriptions and aspects of the polyprene are included in the '718 patent are not repeated herein, for the sake of brevity.

As described in the '718 patent, the copolymer material may begin as a sheet which is bent on a bending machine. After the bending machine places the sheet into a predetermined angle position, an extrusion weld is placed in the interior corner of the bend junction to provide reinforcement and strength. The extrusion weld reinforces the material from any reduction of the physical properties of the material that may occur during the bending process. The extrusion weld is different from other welds, such as the triple weld which suffers the disadvantage of re-heating the plastic walls after each weld rod is put down, and the triangular weld which does not utilize an automatic extrusion welder and must be hand fed by the operator.

U.S. Pat. No. 5,979,686 (the '686 patent), commonly assigned, also described the bent copolymer sheet with the interior extrusion weld. Both the '718 patent and the '686 patent describe the joint in the context of creating large liquid storage tanks, such as those used on fire engines, etc.

SUMMARY OF THE INVENTION

The present invention extends and improves upon the application of the bent copolymer, extrusion weld technology described in the '718 patent and the '686 patent beyond a liquid storage tank included on a fire engine, to the fire engine body (or other truck body) itself. Due to the high reliability and strength of the extrusion weld junction described in the '718 and '686 patents, the junction finds excellent application on the truck body itself, when the truck body is created out of copolymer material.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompany drawings, of which.

DETAILED DESCRIPTION OF THE PRESENTLY PREFERRED EMBODIMENT

Figure 1:
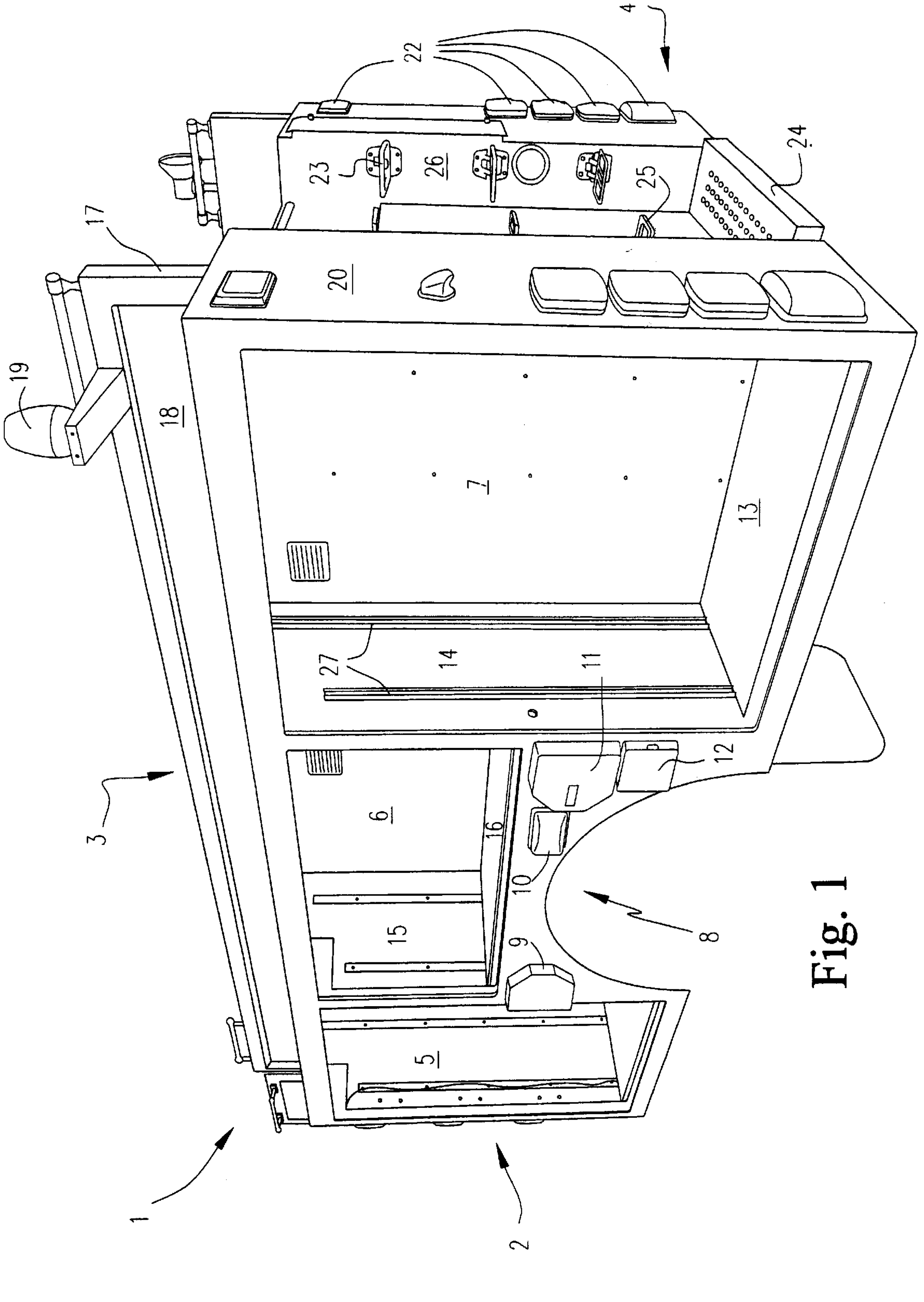
FIG. 1 illustrates a perspective representation of an example fire truck body in accordance with the present invention

FIG. 1 illustrates a perspective representation of an example fire truck body in accordance with the present invention. The truck body 1 includes side 2, top 3, and back 4 shown in FIG. 1. The truck body 1 is composed primarily of copolymer sheets bent and formed, butt jointed, etc. into a contiguous truck body. The top 3 may be designed to support ladders, hoses, etc. as is common on traditional metal truck bodies.

The side 2 may include various compartments 5, 6, and 7, all formed from copolymer materials. Side 2 also contains a wheel well cutout 8 (and may contain more than one wheel cutout depending on the size of the truck body). Control boxes and storage boxes 9, 11, and 12 may be formed of copolymer material, or may be formed of metal and attached to the co-polymer body side 2. Lights such as 10, 22, and 19 may also be attached to the copolymer sides, back 4, and top 3, as shown in FIG. 1, with wiring for the lights being routed through the hollow spaces behind the copolymer framing.

The compartments 5, 6, and 7 are made up of copolymer sheets with bends and butt joints, similar to the liquid storage tank constructions described in the '718 and '686 patents. Thus, sides 15 and 16 of compartment 6 are shown and sides 13 and 14 of compartment 7 are shown in FIG. 1. One can see that each of the compartments 5, 6, and 7 appears, in structural form, as a vertically disposed structure similar to the liquid storage tanks described in the '718 patent and the '686 patent (for example, reference FIG. 14 of the '718 patent without the tank lid 85). Thus, each of the structures formed in the compartments 5, 6, and 7 may contain the extrusion weld bend joints described in the '718 and '686 patents to formulate the corners of the respective compartments.

Other structures, such as the top side portion 17 and 18 of FIG. 1 can be jointed and attached to the sides 2 in order to create the walled spaced in the top 3 for hoses, ladders, etc. Back planes 20 of the back 4 can also be formed from a contiguous sheet with the plane of the side 2—with an extrusion weld being placed in the interior corner formed by the side 2 and the back plane 20 in accordance with the descriptions in the '718 and '686 patents. In such a case, the spaces 5, 6, and 7 can then be butt jointed onto the combined side and back portions 2/20 such that the spaces 5, 6, and 7 line up with corresponding cutouts of the side 2.

Other aspects of the traditional fire engine body, such as siren lights 19, operational and emergency lights 22, hangers 23, steps 24 and 25, and shelf rails 27, can be attached to the copolymer truck body to give the truck body traditional fire truck operational characteristics.

Interior surface 26 of the back 4 can attach to the back plane 20 using the bent edge technology described in the '718 and '686 patents. In other words, the side 2, back plane 20, and interior back surface 26 can be formed using two bent edge joints, one forming the angle between side 2 and surface 20 and the other forming the angle between surface 20 and surface 26. Of course, two such angled pieces are required, one for the left side of the truck and one for the right side of the truck. The side 2 can be formed from a single sheet of copolymer or from a number of butt jointed pieces of copolymer.

One can see that the locations of bent edges on the truck body 1 will vary depending on design choices. Because of the bending requirements, not all of the angles of the truck body shown in FIG. 1 can be formed of the bent edge technology since there are multiple orthogonal planes on the entire truck body 1. The present invention is not limited to the use of bent edge technology at any particular location, provided the bent edge technology is used in some locations of the truck body to provide the increased strengths described in the '718 and '686 patents. Thus, although the angle between side 2 and back plane 20 is described above in an example embodiment as being a bent edge technology corner, it need not be such, provided other corners of the truck body 1 have the bent edge technology. One can see that different fire truck body designs will suggest different strategies for where butt joints and where bent edge joints can be most strategically positioned.

Figure 2:
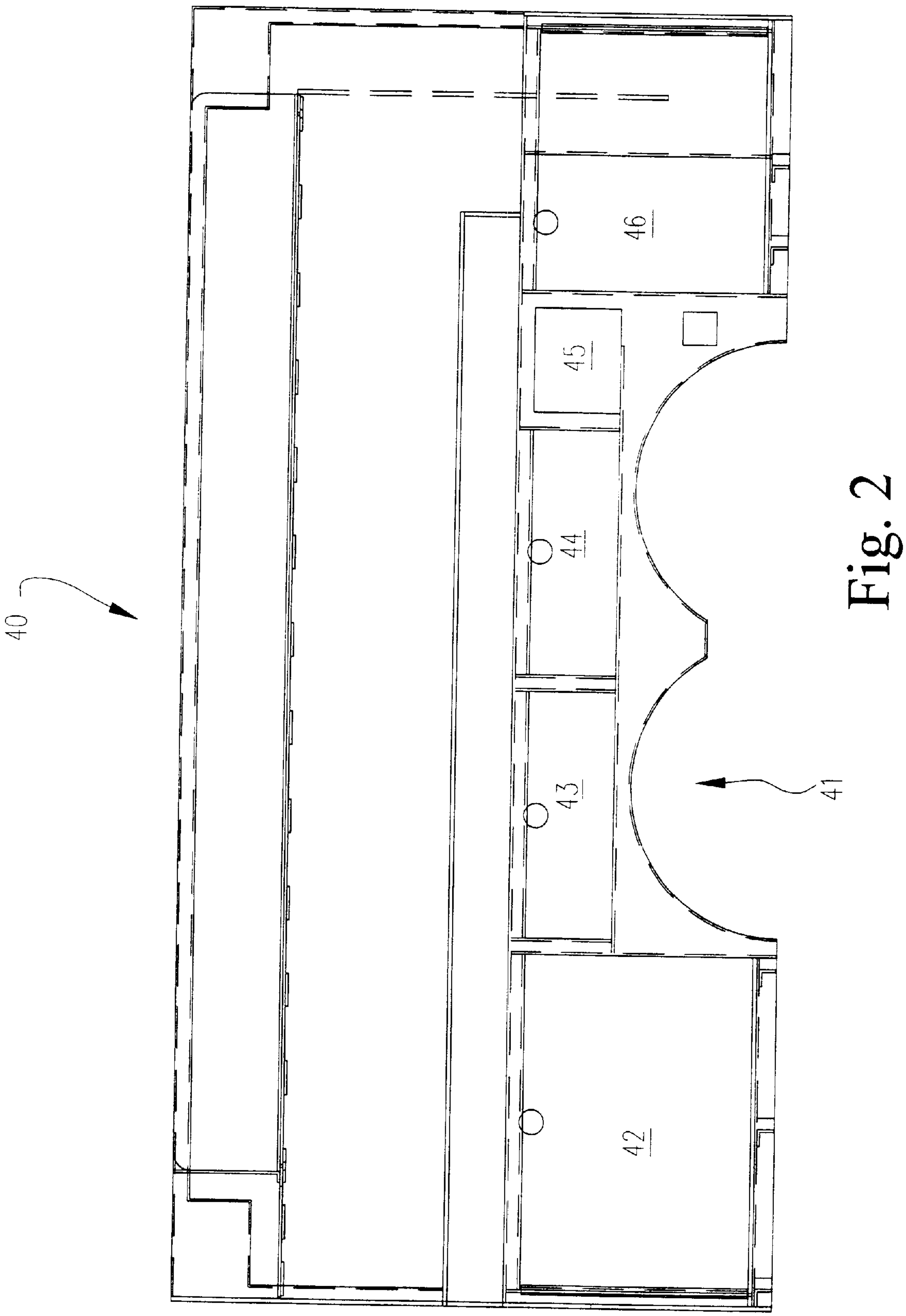
FIG. 2 is a side view of an example truck body in accordance with the present invention.

The present invention is also not limited to the particular design shown in FIG. 1. For example, FIG. 2 shows an alternative design for a fire truck body (side view). Still other alternative truck bodies, such as water trucks, ambulances, commercial trucks, etc. are also envisioned though not specifically shown. In FIG. 2, the fire truck body 40 has a double wheel well 41 and different compartmenting 42–46. Other aspects of the truck body of FIG. 2 are similar to (though not necessarily identical to) those described in FIG. 1, such as the back portion 4, top ladder portion 3, etc.

Figure 3:
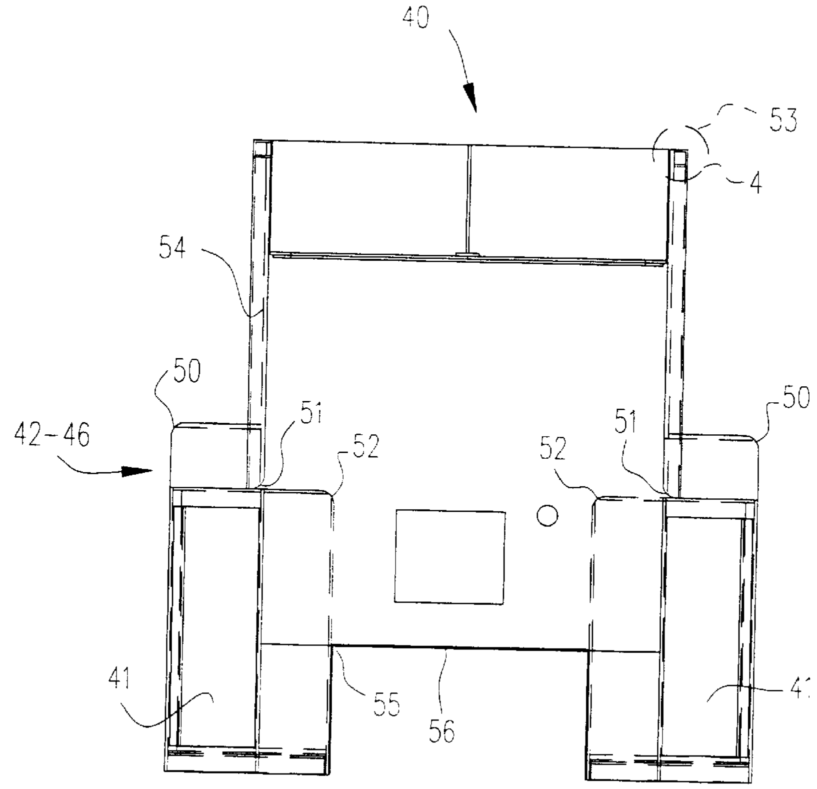
FIG. 3 is a cut-away view of an example truck body in accordance with the present invention.

FIG. 3 illustrates a back view of the truck body of FIG. 2. FIG. 3 illustrates where some bent edge technology corners can be strategically located for strength in the embodiment of FIGS. 2 and 3. The bent edge location shown in FIG. 3 are shown by way of example in order to illustrate where certain bent edge corners can be located. The present invention is not limited to the location of any particular bent edge corner on the fire truck body, but other arrangements of bent edge and butt corner arrangements will be recognized based on the particular fire truck body characteristics. Thus, in FIG. 3, wheel well 41 and compartments 42–46 are shown by reference to FIG. 2. At the top junction 50 of the compartments 42–46, a bent edge corner can be provided for top strength. Further, the interior corner 51 of the compartments 42–46 where the side surface 54 of the fire truck body 40 extends upward, can also be formed of a bent edge. The interior wheel well corner 52 can also be a bent edge corner. In the example embodiment of FIG. 3, the bottom plane 56 of the truck body 40 meets the wheel well 41 at a butt joint 55.

Figure 4:
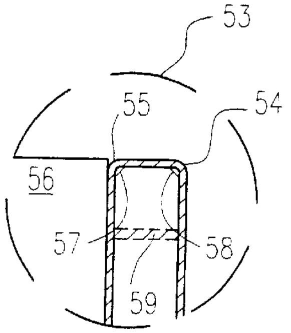
FIG. 4 is a cut-away enlargement of a portion of FIG. 3.

A channel 53 is provided near the top of the truck body 40 (near the hose and ladder storage area), as shown in greater detail in FIG. 4. The channel 53 is formed of a single copolymer sheet with bent edges 54 and 55 forming the channel. As described in the '718 and '686 patents, extrusion wells 57 and 58 are included in the interior corners of the bent edge corners 54 and 55. A cross member 59 is then provided opposite the bent edge corners 54 and 55 and is butt welded to the interior of the channel to form a strong channel box running the length of the fire truck body 40. The channel 53 then attaches to the remaining truck body 56 by a surface adhesive or weld to provide strength to the fire truck body.

Figure 5:
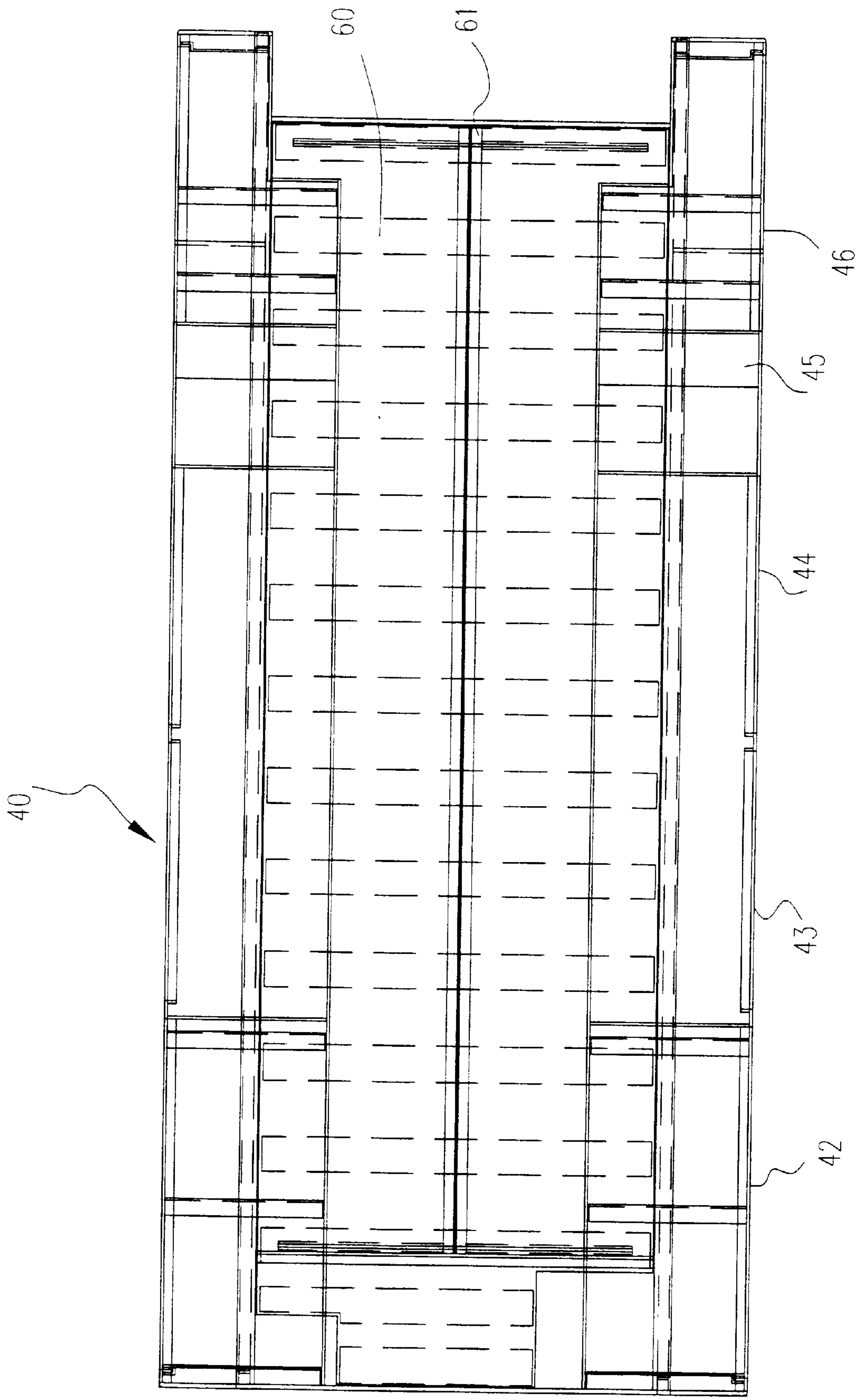
FIG. 5 is a top view of an example truck body in accordance with the present invention.

FIG. 5 is a top view of the truck body 40 previously described with respect to FIGS. 2–4. Taking together, FIGS. 2, 3, and 5 provide three orthogonal views of the same truck body 40. In FIG. 5, the compartments 42–46 are illustrated to provide orientation with respect to FIG. 2. The truck body 40 is mounted on slats 60 which adhere to the truck frame of the truck carrying the truck body 40. Butt weld 61 is also shown providing longitudinal strength and connection between the respective left and right portions of the truck body 40. As previously described, the various corners shown in the truck body 40 are comprised of bent edge corners and butt corners in accordance with strength requirements of the particular junctions.

Figure 6:
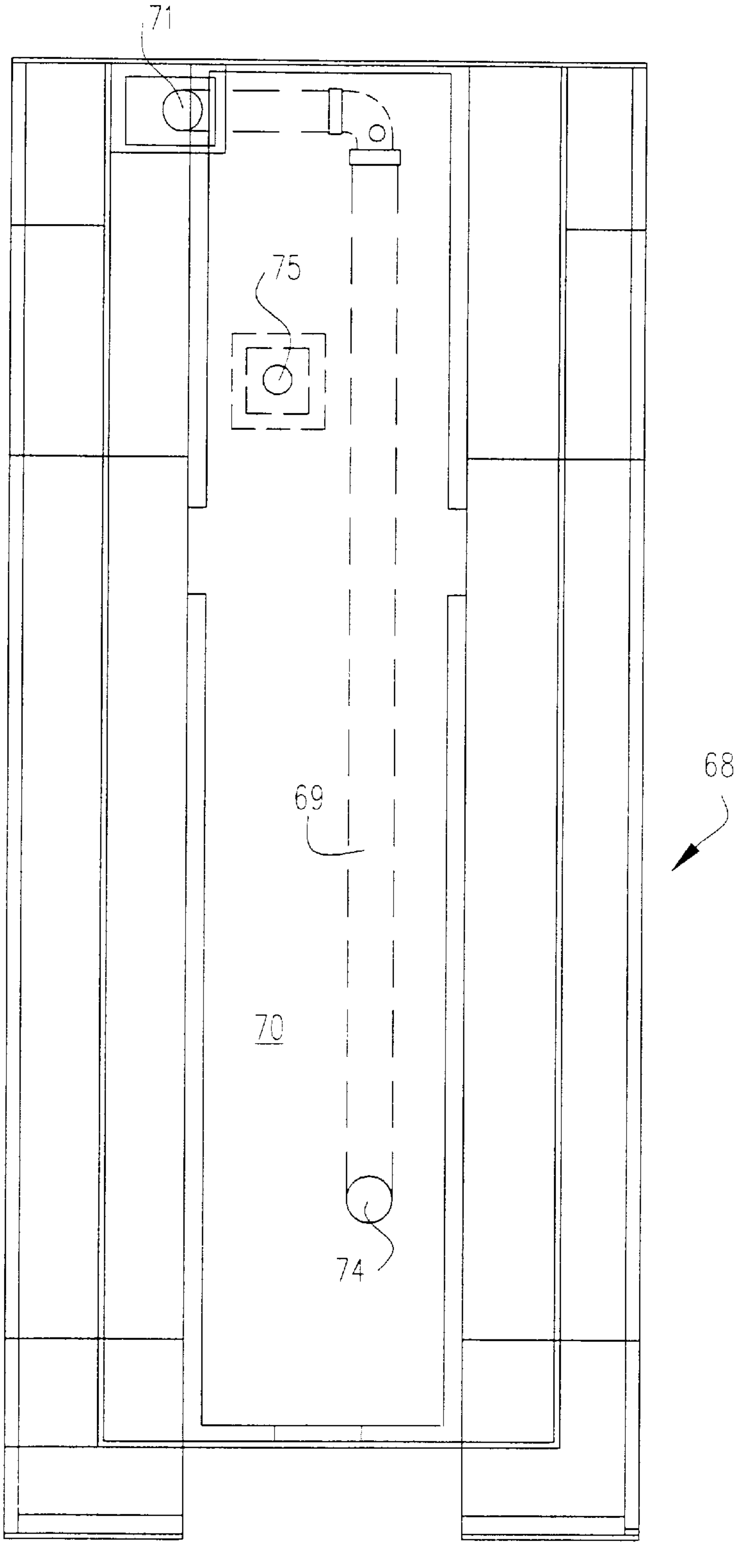
FIG. 6 is another top view of an example truck body in accordance with the present invention.
Figure 7:
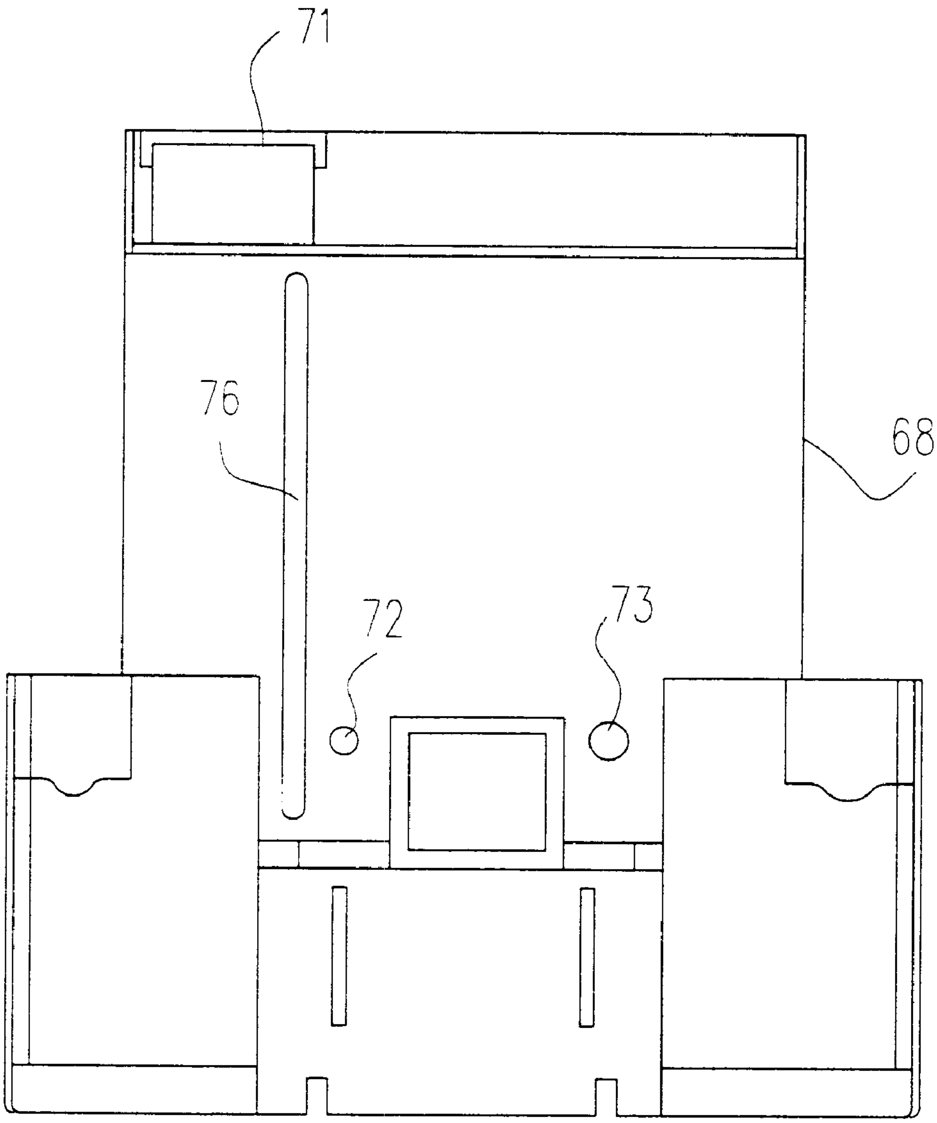
FIG. 7 is a rear view of an example truck body in accordance with the present invention.

FIGS. 6 and 7 illustrate an embodiment that provides substantial advantages by combining the liquid storage tank and truck body into a common unit. In this embodiment, the truck body itself serves as both the exterior truck body and the liquid storage tank such that by filing the "tank" one is actually filing the truck body itself. In this case, the liquid storage tank associated with the fire truck body is intricately formed as the truck body, with both being formed of the same copolymer sheets. Thus, in FIG. 6, the truck body 68 either is an intricately formed tank 70 of the copolymer used to formulate the truck body 68 or includes a tank integrally formed in the body (like a matchbox). The liquid storage tank 70 is formulated in the same kind of manner as that described in the '718 and '686 patents. The tank 70 includes certain plumbing features in order to fill and pump water to and from the tank 70. Specifically, junction 71 connects the plumbing 69 to the tank 70 and provides fluid communication to an overflow outlet 74. Pump connection 75 provides a standard connect valve between the tank 70 and a water pump. Tank fill ports 72 and 73 (FIG. 7) are located on the rear of the truck body 68 and provide standard valves for filling the tank 70 with water. Site gauge 76 provides an external indication of the fluid level in the tank 70 in the truck body 68.

The common tank/body embodiment provides substantial advantages. It provides a lower overall center of gravity, which is advantageous for a number of reasons including travel safety. The common tank body in the matchbox style embodiment is substantially stronger than the non-integral tank in the truck body.

The tank 70 can be an externally created liquid storage tank, as described in the '718 and '686 patents, which tank is then inserted in and mounted on the copolymer truck body 68. Alternatively, the liquid storage tank 70 can be certain interior compartments created by the copolymer truck body 68 itself, such that the truck body 68 provides both the external structure for the fire truck and the internal storage tank for the fire truck water. There are different efficiencies associated with each alternative. If the liquid storage tank 70 is intricate with the truck body 68, there is a material and manufacturing savings associated with the omission of the intricate tank components. On the other hand, mounting a separate tank 70 into the copolymer truck body 68 permits the tank 70 to be removed and repaired or replaced without repairing or replacing the entire truck body 68. Of course, the tank 70 and truck body 68 may even share some common components such that a portion of the truck body 68 provides a portion of liquid storage tank 70 and an externally created liquid storage tank portion can formulate the remainder of the liquid storage tank 70. In such a case, the portions of a liquid tank contributed by the body 68 and the portions contributed by the tank 70 would be welded together to form a water-tight liquid storage tank on the fire truck.

While not specifically illustrated in the Figures described above, the channel 53 of FIG. 4 can be employed in various other locations of the truck bodies 40 and 48 in order to provide channel strength in other strategic locations of the truck body, beyond the examples described in FIGS. 3 and 4. Such channel construction may be strategically located, for example, in the under portions of the truck bodies 40 and 68 in order to provide structural strength between the truck bodies 40 and 68 and the frame of the truck to which the truck body is attached.

From a review of the above described embodiments, one can see that the copolymer material of the present truck body can provide for increased vehicle pay load, corrosion resistance, and high impact resistance compared to standard metal truck bodies. The copolymer fabrication in welding design also provides design flexibility such that customized fire truck bodies can be easily accommodated in the manufacturing process. When painted, the copolymer material appears no different than standard metal fire truck bodies.

Although not specifically limited to such, the example embodiments above described employ polyprene copolymer formulated from sheet stock material ⅜ inches to ¾ inches thick. The polyprene is 100% virgin grade, made from aristech resin. This resin is made up of a combination of ethylene and propylene polymers. Although other copolymers may be envisioned as acceptable alternatives, the above described material is well suited for truck bodies since it is strong and yet flexible enough to resist cracking and fatigue due to constant movement. The polyprene example copolymer can be painted and repaired if damaged. It also does not rust, corrode, crack, chip or peel under traditional truck usage. The copolymer is impervious to microbial attack from, for example, the stored water. Although polyethylene and polypropylene may provide alternative copolymer materials, polyprene is substantially stronger at high and low temperature applications, and is thus preferred.

Because the truck bodies of the present invention are formed of the copolymer material, custom and pre-engineered designs can be easily accommodated using auto CAD technologies. The location of bent edge corners, fusion weldings, extrusion weldings, and thermoplastic fabrication processes may be incorporated into the truck bodies in accordance with strategic strength requirements of the truck body portions.

Although the present invention is also described with respect to fire truck bodies, it has additional application in many other truck bodies, such as contractor truck bodies, delivery truck bodies, utility truck and van bodies, personal van bodies, and other commercial bodies.

Any type of options required for the particular type of commercial truck bodies can be added onto (for example, attached to) the copolymer truck body structure. For example, rollup doors, shelves, service repair kits, electrical kits, trim, lighting, etc., can all be attached to the copolymer body to provide an application-specific truck body.

While the invention has been described in connection with what is presently considered to be the most practical and preferred embodiments it is to be understood that the invention is not to be limited to the disclosed embodiments but on the contrary, is intended to cover various modifications and equivalent arrangements included within the spirit and scope of the appended claims.

What is claimed is:

1. A copolymer truck body for mounting on a truck frame, comprising:

a set of interconnected copolymer body portions together providing both an exterior structure defining the copolymer truck body for mounting on the truck frame and an integrally associated liquid storage tank, said copolymer body portions together defining exterior truck body walls and at least one of said walls being of a common copolymer sheet that simultaneously provides both an exterior truck body surface defined by a first plane of the common copolymer sheet and an interior liquid storage tank surface defined by an opposite plane of the common copolymer sheet.

2. A truck body according to claim 1, wherein set of interconnected copolymer body portions also define a wheel well portion.

3. A truck body according to claim 1, wherein the interconnected copolymer truck body portions form a fire truck body.

4. A truck body according to claim 1, wherein the set of interconnected copolymer body portions also define an integrally associated material storage compartment of the truck body.

5. A copolymer truck body according to claim 1, further comprising:

a bend in at least one of said copolymer body portions, said bend forming a predetermined angle and having an extrusion weld at an interior corner of the bend.

6. A truck body according to claim 5, further comprising plural said bends and corresponding extrusion welds.

7. A truck body according to claim 1, wherein at least a portion of said interconnected copolymer body portions is operatively arranged for water tight contact with a stored liquid.

8. A truck body as in claim 1, wherein collectively the set of interconnected copolymer body portions provide an interior truck body surface for water tight contact with a stored liquid.

9. A fire truck body, comprising:

an integrally formed copolymer enclosure simultaneously providing both:

a liquid containment tank having at least one planar interior tank surface defined by at least one surface of the copolymer enclosure, and a structural body exterior having at least one planar exterior body surface defined by at least one opposing surface of the copolymer enclosure.

10. A fire truck body according to claim 9, wherein a single contiguous copolymer sheet commonly provides at least a portion of both the liquid storage tank and the structural body exterior.

11. A truck body according to claim 9, wherein the material storage compartment is integrally formed with the truck body on a side of the truck body, said interconnecting copolymer body portions together defining an interior truck body space at least a portion of which also defines the liquid storage tank, and said material storage compartment extending into said interior truck body space and thereby also into the liquid storage tank.

12. A truck body as in claim 11, where a second common copolymer sheet simultaneously provides both an interior surface of the material storage compartment defined by a first plane of the second common copolymer sheet and another interior surface of the liquid storage tank defined by an opposite plane of the second common copolymer sheet.

13. A truck body as in claim 9, wherein at least a portion of the interconnected copolymer body portions define an exterior truck body space at least a portion of which also defines the required storage tank.

* * * * *